United States Patent [19]

Sakaguchi

[11] Patent Number: 5,021,977

[45] Date of Patent: Jun. 4, 1991

[54] IMAGE DATA READ OUT SYSTEM IN A DIGITAL IMAGE PROCESSING SYSTEM

[75] Inventor: Kazuaki Sakaguchi, Yokohama, Japan

[73] Assignee: Fujitsu Limited, Kawasaki, Japan

[21] Appl. No.: 347,755

[22] Filed: May 5, 1989

[30] Foreign Application Priority Data

May 11, 1988 [JP] Japan ............................... 63-113895

[51] Int. Cl.[5] ............................................. G06K 15/00

[52] U.S. Cl. .................................... 364/521; 364/200; 364/900

[58] Field of Search ................................ 364/518-523, 364/957 MS, 957.1 MS, 927.2 MS, 254 MS, 254.3 MS, 237.2 MS; 358/444; 340/798, 799; 382/56

[56] References Cited

U.S. PATENT DOCUMENTS 4,791,680 12/1988 Yokoe et al. ..................... 358/261.1

*Primary Examiner*—Arthur G. Evans

*Attorney, Agent, or Firm*—Staas & Halsey

[57] ABSTRACT

An image data read out system in a digital image processing system which includes an image buffer memory for storing image data, a predetermined area of the image buffer memory being defined as a window having n (columns)×m (rows). An image data processing circuit sequentially reads out the image data from every one column in the image buffer memory, converts a bit structure of the image data from parallel data to serial data, packs the serial data into packed data in predetermined groups of bits and transfers the packed data to a next stage. A basic line memory group has n basic line memories, where n corresponds to a number of columns, each of the basic line memories having m line memories, where m corresponds to a number of rows. The image data of one column is stored in one of the basic line memories such that each bit of the image data is shifted one by one at every one of the basic line memories. An order conversion circuit aligns an order of the image data simultaneously read out from each of the basic line memories in accordance with the order of the columns in the image buffer memory. A microprocessor accesses the same address of each of the basic line memories, simultaneously reads out accessed image data from each of the basic line memories, and calculates the accessed image data after aligning the accessed image data in the order conversion circuit.

8 Claims, 13 Drawing Sheets

BASIC LINE MEMORY

IMAGE DATA READ OUT SYSTEM IN A DIGITAL IMAGE PROCESSING SYSTEM

BACKGROUND OF THE INVENTION

1. Field of the Invention

The present invention relates to an image data read out system. More particularly, it relates to a read out system for reading out the image data stored in a predetermined area (below, window) of an image buffer memory in response to an instruction from an image processor.

2. Description of the Related Art

In a digital image processing system, an image processor reads out image data from a window of an image buffer memory having n columns×m rows. As one example of the processing operation, the image data read out from the window is processed based on a "local operation", for example, "spatial filtering". In this case, the reading out operation from the window must be performed with high speed since the amount of data stored in the image buffer memory is very large.

Conventionally, a special computer is provided for achieving high speed local operation. Such a special computer has a pipe-line structure and comprises special hardware having a special function in accordance with contents of the processing operation. However, it is troublesome to provide the special hardware in each content of the processing operation.

Recently, a microprocessor has been used as one countermeasure to the above-mentioned problems. The microprocessor may be a general type and is controlled by a microprogram. According to such a microcomputer, it is possible to realize various image processing operations by rewriting software in accordance with contents of the processing operations.

In such a microprocessor, however, the processing speed is considerably reduced when performing a complex image processing operation since a complex microprogram must be rewritten. For example, nine access operations by a general type microprocessor are necessary for reading out the image data from a window having a size of 3 (columns)×3 (rows).

SUMMARY OF THE INVENTION

The object of the present invention is to provide an image data read out system in a digital image processing system enabling high speed reading out of image data from a window when using a general type image processor.

In accordance with the present invention, there is provided an image data read out system in a digital image processing system comprising an image buffer memory for storing image data, a predetermined area of the image buffer memory being defined as a window having a size of n (columns)×m (rows), an image data processing circuit for sequentially reading out the image data from each column in the image buffer memory, converting the bit structure of the image data from parallel data to serial data, packing the serial data into a packed data format in predetermined groups of bits, and transferring the packed data to a next stage. Also provided is a basic line memory group having n basic line memories, where n corresponds to a number of columns, each of the basic line memories having m line memories, where m corresponds to a number of rows, the image data of one column stored in one of the basic line memories in such a way that each bit of the image data is shifted one by one at every one of the line memories. An order conversion circuit, for aligning an order of the image data simultaneously read out from each of the basic line memories in accordance with the order of the columns in the image buffer memories, is provided along with a microcomputer for accessing the same address of each of the basic line memories, simultaneously reading out accessed image data from each of the basic line memories, and calculating the accessed image data after aligning the accessed image data in the order conversion circuit.

DESCRIPTION OF THE PREFERRED EMBODIMENTS

Figure 1A:
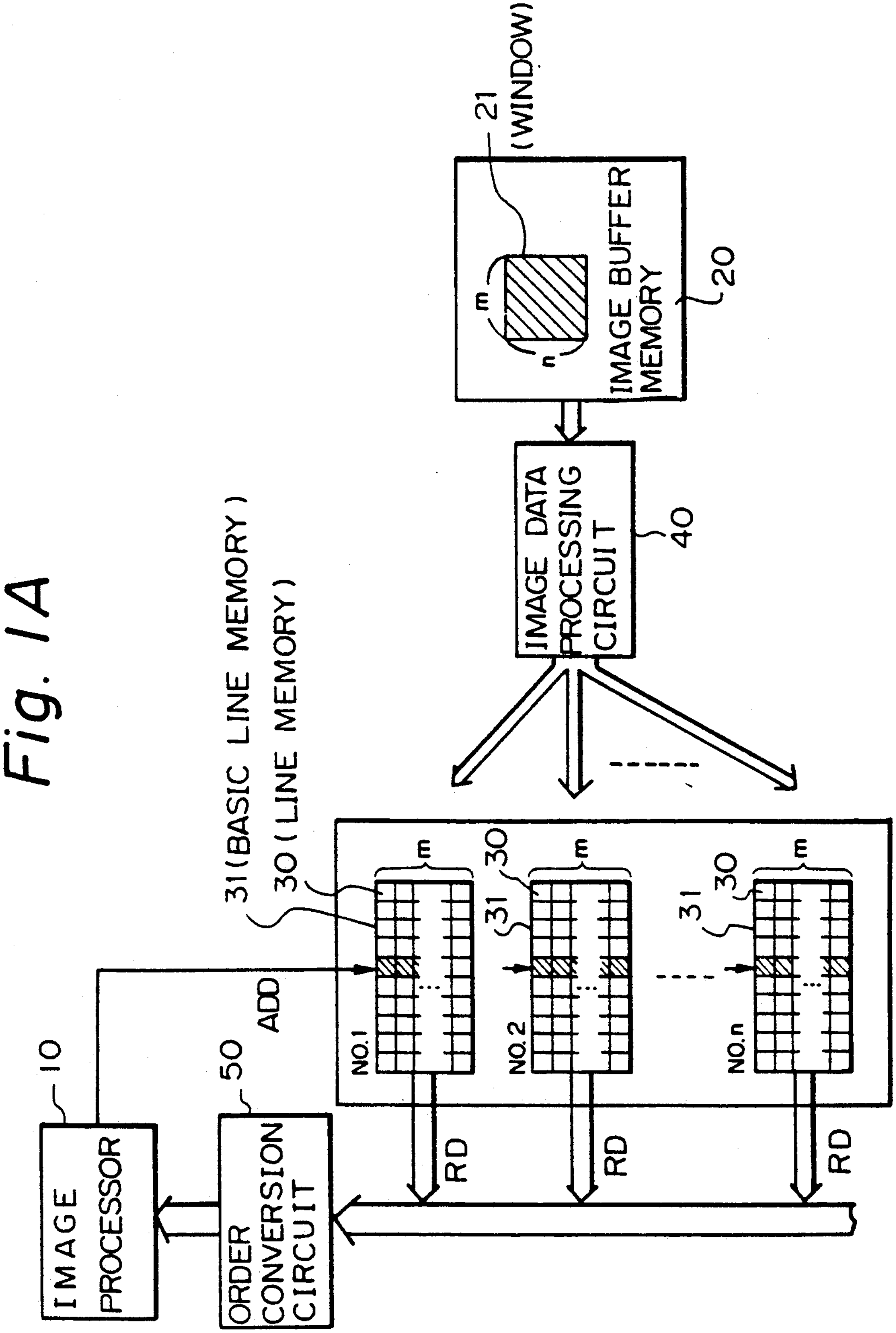
FIG. 1A is a basic block diagram of an image data read out system according to the present invention.

Figure 1A is a schematic block diagram for explaining a principle of the present invention. In FIG. 1, reference number 10 denotes an image processor formed by, for example, a general type microprocessor. 20 denotes an image buffer memory for temporarily storing image data. A predetermined area 21 having a size of n (columns)×m (rows) in the image buffer memory 20 is called a "window". 30 denotes a line memory having a capacity to store the image data of one column of the image buffer memory 20. 31 denotes a basic line memory each having m sets of the line memories. The basic line memory group (No. 1 to No. n) is formed by n sets of basic line memories. 40 denotes an image data processing circuit for sequentially reading out the image data from every column in the image buffer memory 20, converting the bit structure of the image data from parallel data to serial data, packing the serial data into packed data format in predetermined groups of bits, and transferring the packed data to the basic line memory 31. In each basic line memory 31, the read data is sequentially stored in all line memories (i.e., m sets of lines) 30 in such a way that each bit of the read data is shifted one by one at every one of the line memories 30.

50 denotes an order conversion circuit for aligning the order of the image data read out from each basic line memory in accordance with the order of the columns in the image buffer memory.

Figure 1B:
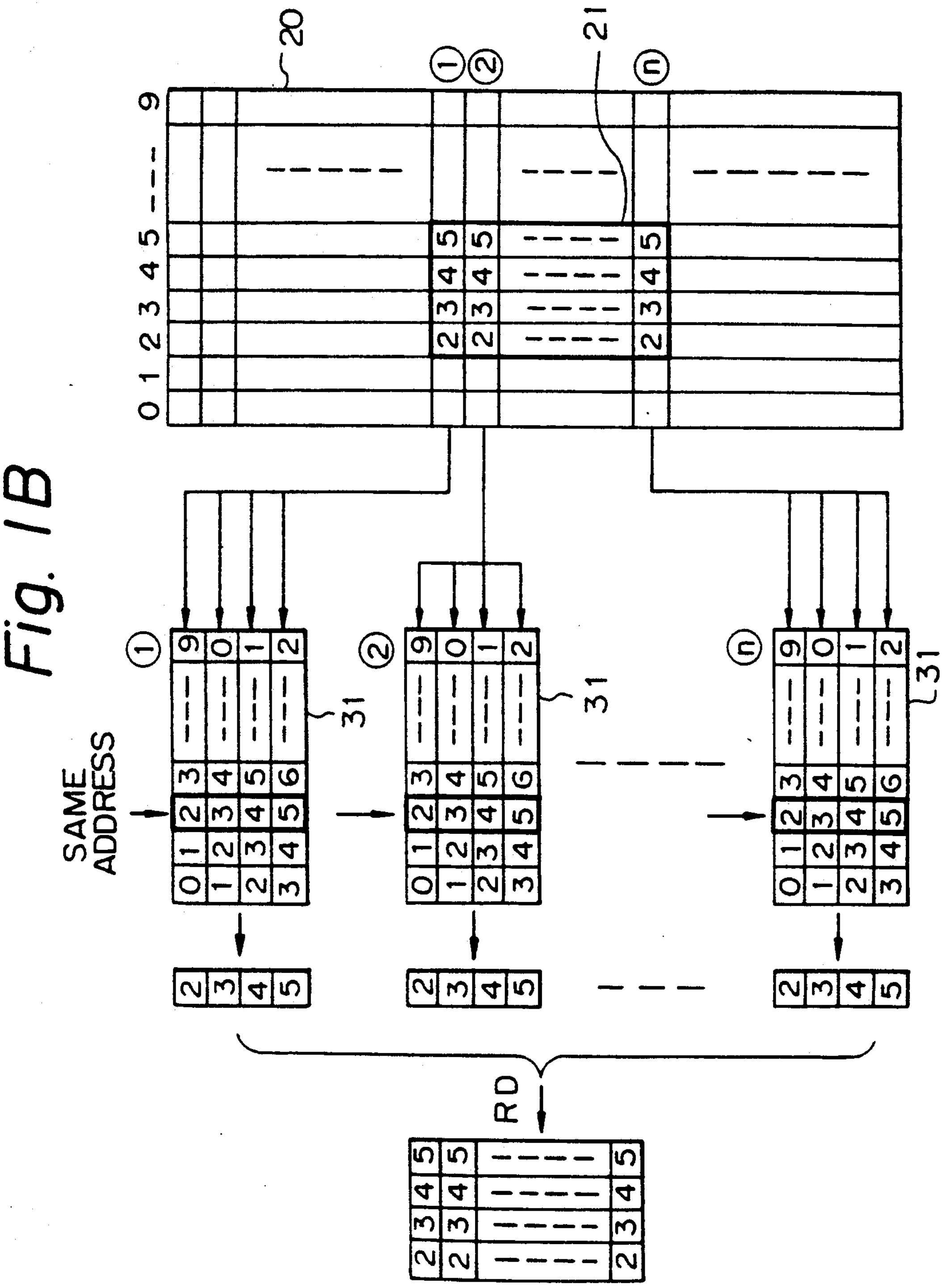
FIG. 1B is a view for explaining a reading out operation from an image buffer memory.

FIG. 1B is a view for explaining a reading out operation from the image buffer memory 20. As shown in the basic line memory 31, the image data of one line (column) "0, 1, . . . , 9" is stored in each line memory 30 in such a way that one bit of the image data is shifted in every line memory as shown in the drawing. Accordingly, when the image processor 10 simultaneously accesses the same address, for example, the third address (cross-hatched portions in FIG. 1A) at every basic line memory 31, it is possible to read out the same image data (2, 3, 4, 5) of the window 21 from the basic line memory 31. The read data RD is formed in the same order as that of the window 21 by the order conversion circuit 50. Accordingly, it is possible to achieve a high speed processing operation since the image data in the window 21 can be read out by only one access from the image processor according to the present invention.

Figure 2:
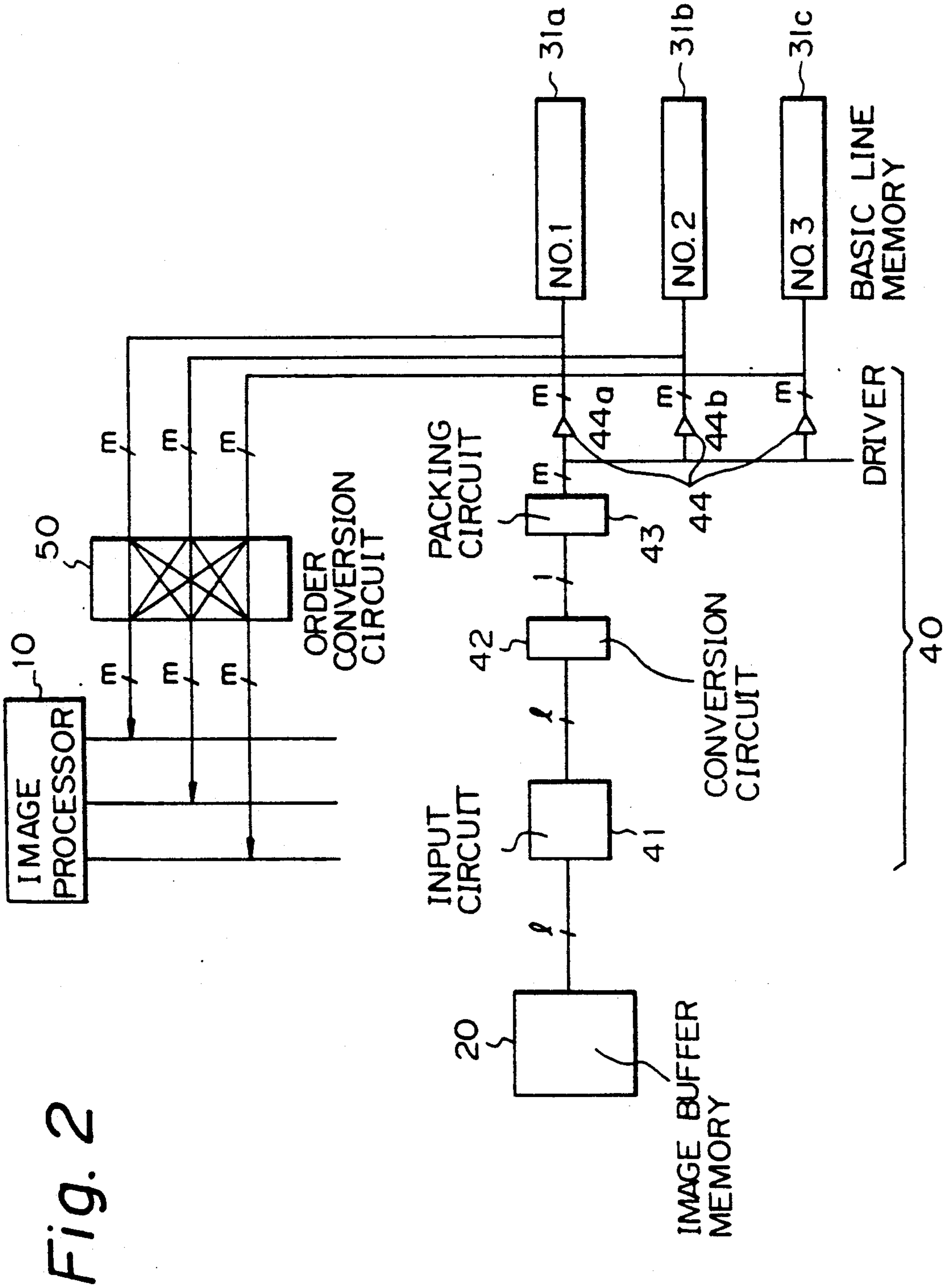
FIG. 2 is a schematic block diagram of the image data read out system according to one embodiment of the present invention.
Figure 3:
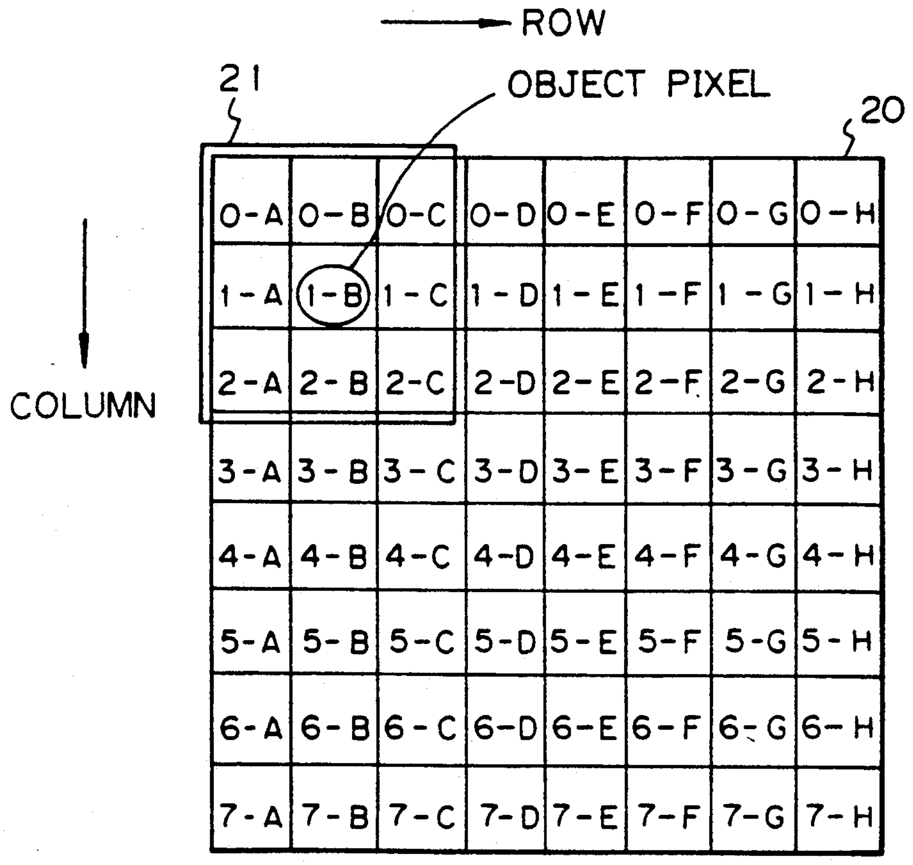
FIG. 3 is one example of image data stored in an image buffer memory.

FIG. 2 is a schematic block diagram for explaining one embodiment of the present invention. Further, FIG. 3 shows one example of the image data stored in the image buffer memory 20.

The image data is stored in an area having 8 (columns)×8 (rows) for simplifying the explanation. In this case, each square denotes one pixel. For example, one pixel corresponds to one bit so that one column and one row are formed by 8 bits. Accordingly, "l" in FIG. 2 is equal to 8 bits.

In FIG. 2, reference number 41 denotes an input circuit, 42 denotes a bit conversion circuit for converting l bits parallel data to one bit serial data, 43 denotes a packing circuit for packing one bit serial data to m bits packed data, and 44 denotes drivers for cyclically selecting the basic line memory. These circuits 41 to 44 constitutes form the image data processing circuit 40 shown in FIG. 1. The input circuit 41 sequentially reads out the image data at every column (i.e., 8 bits) from the image buffer memory 20.

The bit conversion circuit 42 formed by a shift register converts 8 bit parallel data to one bit serial data. One bit serial data is packed at every m bits by the packing circuit 43. The packing circuit 43 is formed by the shift registers 43a and 43b as shown in FIG. 4B. In this case, "m" corresponds to m rows of the window 21 in the image buffer memory 20.

In FIG. 3, the window 21 is formed by, for example, 3 (columns)×3 (rows). "1-B" is a center pixel (object pixel) for accessing this window.

Figure 4A:
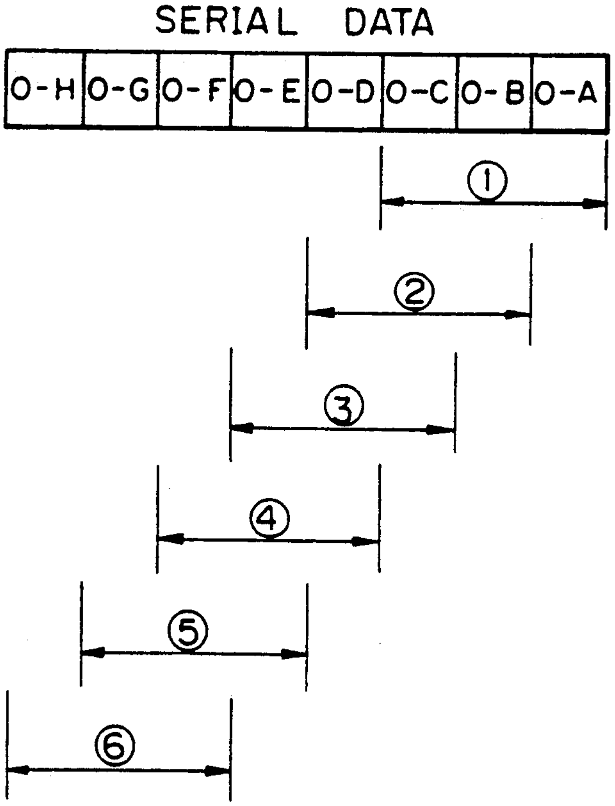
FIGS. 4A and 4B are views for explaining a packing operation of the present invention.
Figure 4B:
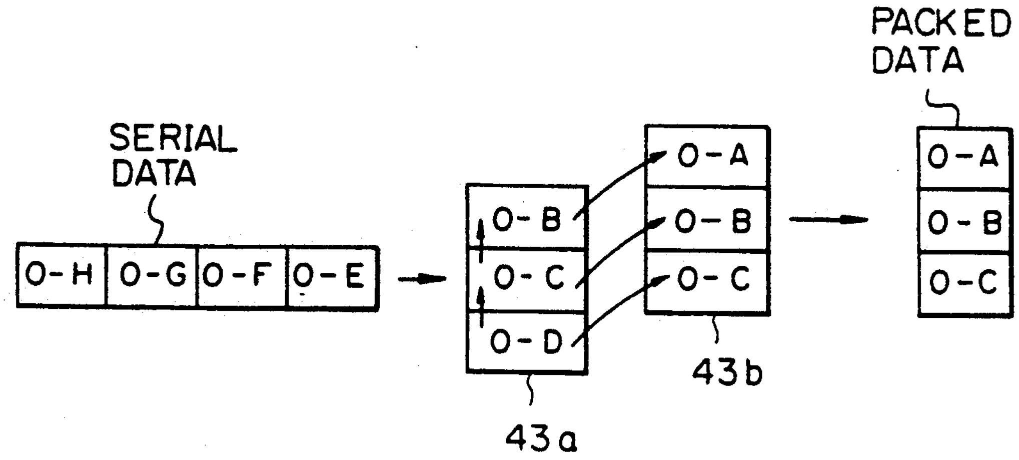

FIGS. 4A and 4B are views for explaining the packing operation according to the present invention and this operation is performed in the packing circuit 43. Where "m" in FIG. 2 is given of "3" for simplifying the explanation. As shown in FIG. 4A, 8 bit serial data "0-A, 0-B, . . . , 0-H" is sequentially packed at every 3 bits ① to ⑥. The first shift register 43a performs this 3 bits packing operation and the packed 3 bits are transferred to the second shift register 43b when a next one bit is input thereto. The second shift register 43b outputs the packed data to the corresponding basic line memory 31. The basic line memory 31 stores each packed data (0-A, 0-B, 0-C), (0-B, 0-C, 0-D), (0-C, 0-D, 0-E), . . . as shown in FIG. 5.

Each driver 44 is used for cyclically switching the basic line memory 31. That is, when the packing circuit 43 outputs the packed data of the first column of the window, the driver 44a is opened and the packed data is taken into the basic line memory 31a. When the packing circuit 43 outputs the packed data of the second column, the driver 44b is opened and the packed data is taken into the basic line memory 31b. When the packing circuit 43 outputs the packed data of the third column, the driver 44c is opened and the packed data is taken into the basic line memory 31c.

Figure 5:
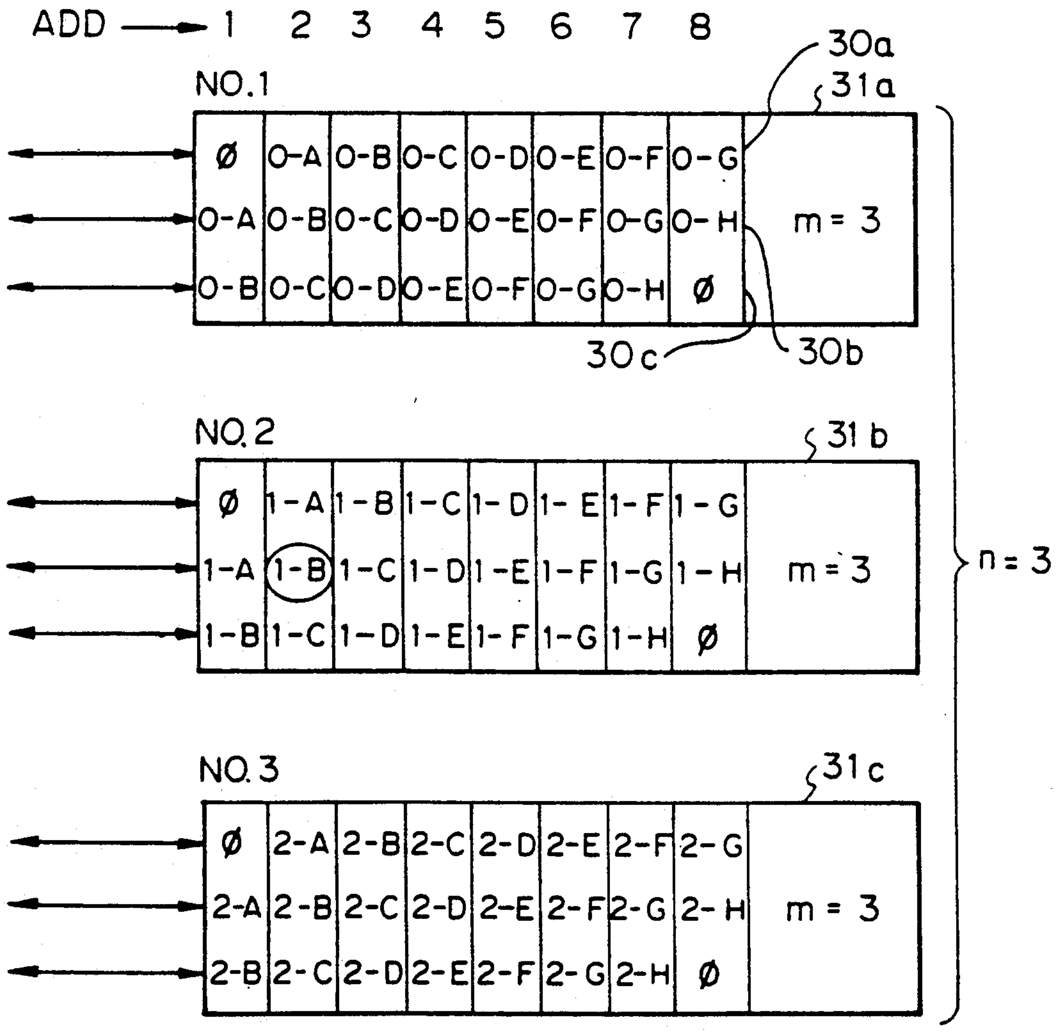
FIG. 5 is a view for explaining image data stored in a basic line memory.

FIG. 5 is a view for explaining stored image data in the basic line memory 31. The first line memory 31a comprises the line memories 30a, 30b and 30c, where "m" is given as "3". That is, the number of the line memories at every basic line memory is given as "3". This drawing shows the case in which the window has a size of 3 (columns)×3 (rows) (i.e., n=3, m=3). This window is shown in FIG. 3. The center pixel "1-B" is the object pixel in the window.

The image processor 10 can simultaneously read out all image data stored in the same address from all of the basic line memories by only one access as explained above. For example, when the image processor 10 designates the second address ADD 2 in each basic line memory, the image data (0-A, 0-B, 0-C), (1-A, 1-B, 1-C) and (2-A, 2-B, 2-C) can be simultaneously read out from each of basic line memories 31a to 31c.

Figure 6:
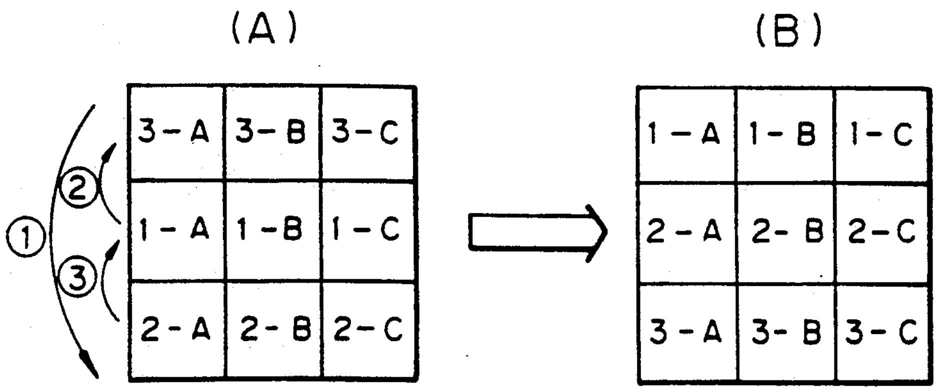
FIG. 6 is a view for explaining conversion of bit order in an order conversion circuit.

FIG. 6 is a view for explaining conversion of bit order in the order conversion circuit 50. This circuit is formed by a plurality of multiplexers and is used for aligning the order of the columns as explained in detail in FIG. 10. That is, since the image data of the fourth column (3-A, 3-B, . . . , 3-H) shown in FIG. 3 is taken into in the basic line memory 31a through the driver 44a, the configuration of the window read out from the basic line memories 31a to 31c becomes as shown by (A) in FIG. 6 if the order of the column is not aligned. Accordingly, it is necessary to change the bit order in the window as shown by (B) in FIG. 6. The order conversion circuit 50 is provided for aligning the bit order of the window from the form (A) to the form (B) as explained in detail in FIG. 10.

Figure 7:
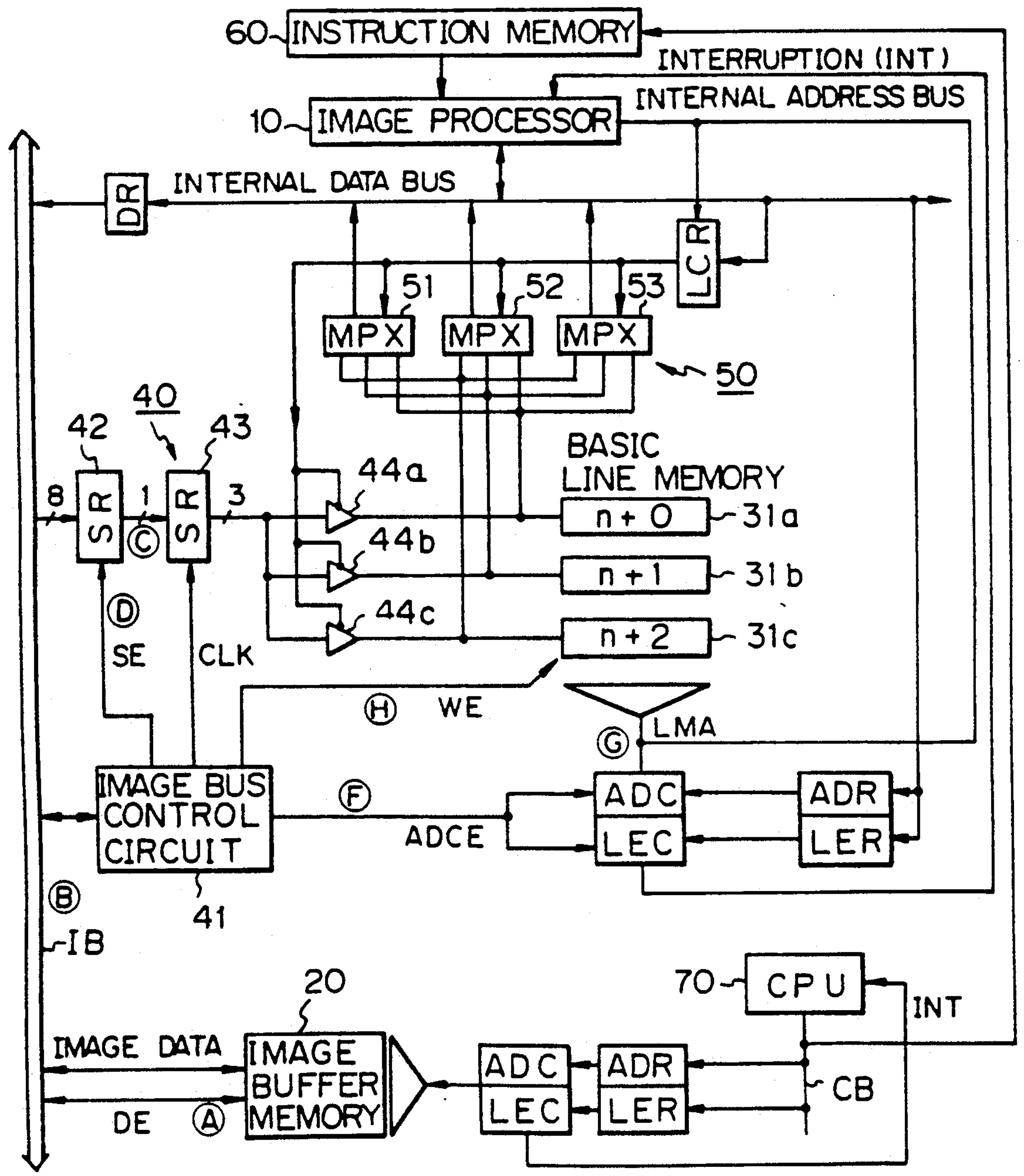
FIG. 7 is a detailed block diagram of the image data read out system shown in FIG. 2.

FIG. 7 is a detailed block diagram of the image data read out system shown in FIG. 2. In FIG. 7, the same reference numbers in FIG. 2 are attached to the same components in this drawing. The reference number 60 denotes an instruction memory and 70 denotes a central processing unit (CPU) for controlling the whole system. Further, the reference ADC denotes an address counter, LEC a length counter, ADR an address register, and LER a length register. The order conversion circuit 50 is formed by three multiplexers 51 to 53.

Figure 8A:
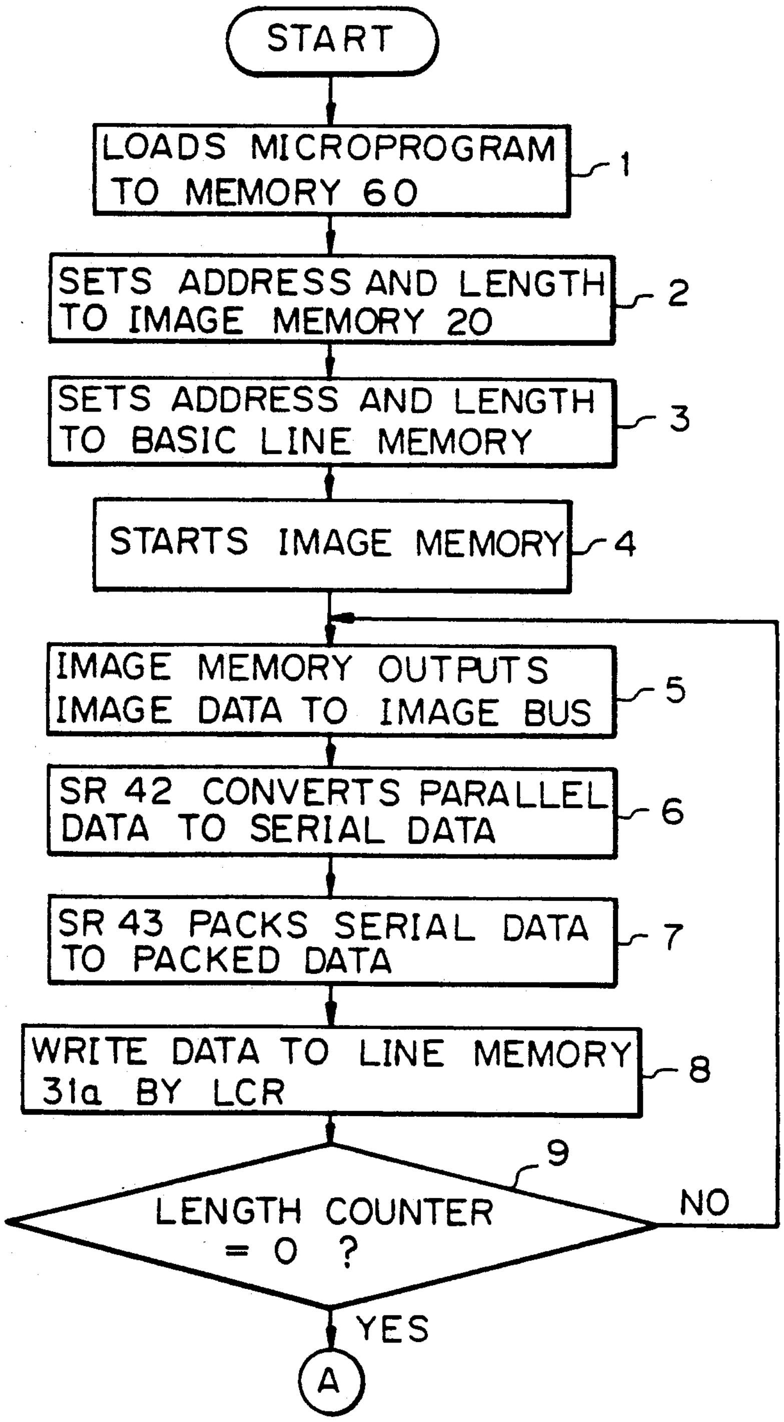
FIGS. 8A and 8B are flowcharts for explaining the operation of the image data read out system shown in FIG. 7.
Figure 8B:
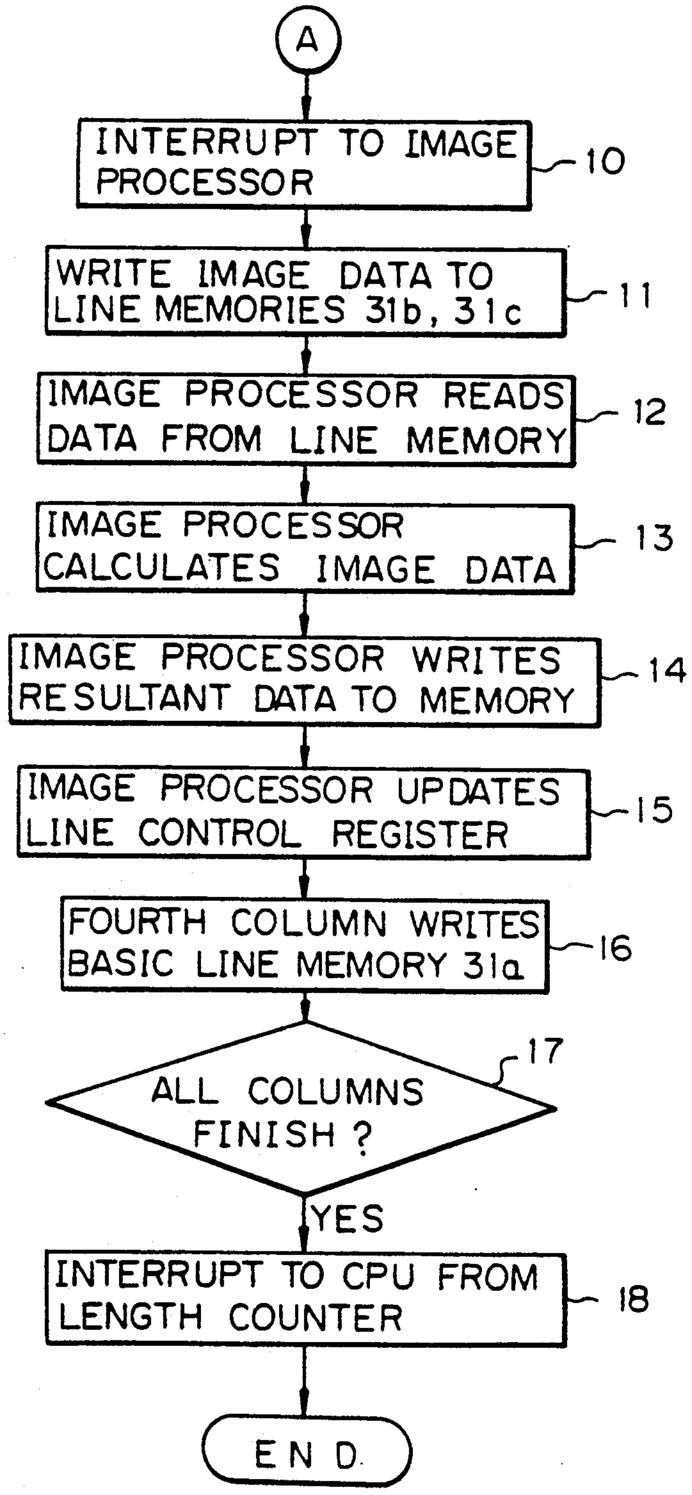

FIGS. 8A and 8B are flowcharts for explaining the operation of the image data read out system shown in FIG. 7.

The operation of the image data read out system is explained with reference to FIGS. 8A and 8B.

The central processing unit 70 loads the microprogram into the instruction memory 60 (step 1). The CPU 70 sets the initial value of the address counter ADC and the length counter LEC through the address register ADR and the length register LER (step 2). The image processor 10 starts a processing operation based on the microprogram stored in the instruction memory 60, and sets the address and the length of the window to the address counter ADC and the length counter LEC through the address register ADR and the length register LER (step 3). When the image buffer memory 20 is activated by the CPU 70 (step 4), the image buffer memory 20 outputs the image data to the image bus 1B (step 5).

The image bus control circuit 41 is provided as the input circuit shown in FIG. 2 and generates a clock signal for controlling the operation of the shift registers 42 and 43. The shift register 42 is provided as the bit conversion circuit shown in FIG. 2, and the shift register 43 is provided as the packing circuit 43 shown in FIG. 2. The shift register 42 converts 8 bit (8 pixels) parallel data into one bit (pixel) serial data (step 6). The shift register 43 packs one bit serial data into 3 bits packed data (step 7). The line control register LCR controls the ON/OFF of the driver 44 and the image data of the first column is written into the basic line memory 31*a* (step 8).

When the first column is written into the basic line memory 31*a*, the length counter LEC returns to zero (step 9) and sends an interrupt command INT to the image processor 10 (step 10). In this case, the length counter LEC is set to the number of bits in one column. The above steps are repeated for the second basic line memory 31*b* and the third basic line memory 31*c* (step 11). When all image data is stored in all basic line memories 31*a* to 31*c*, the image processor 10 reads out the image data from the basic line memories 31*a* to 31*c* through the multiplexers 51 to 53 shown in detail in FIG. 10.

The image processor 10 calculates the image data (step 13) and the resultant data is written into the image buffer memory 20 through the driver DR and image bus IB (step 14). After the above steps, the line control register LCR is updated (step 15). The image data of the fourth column is written into the first basic line memory 31*a* by the same steps as set forth above (step 16). The image processor 10 determines whether or not all columns are transferred to the basic line memory (step 17). If all columns are finished, the interrupt INT is sent from the length counter of the image buffer memory 20 to the CPU 70.

Figure 9:
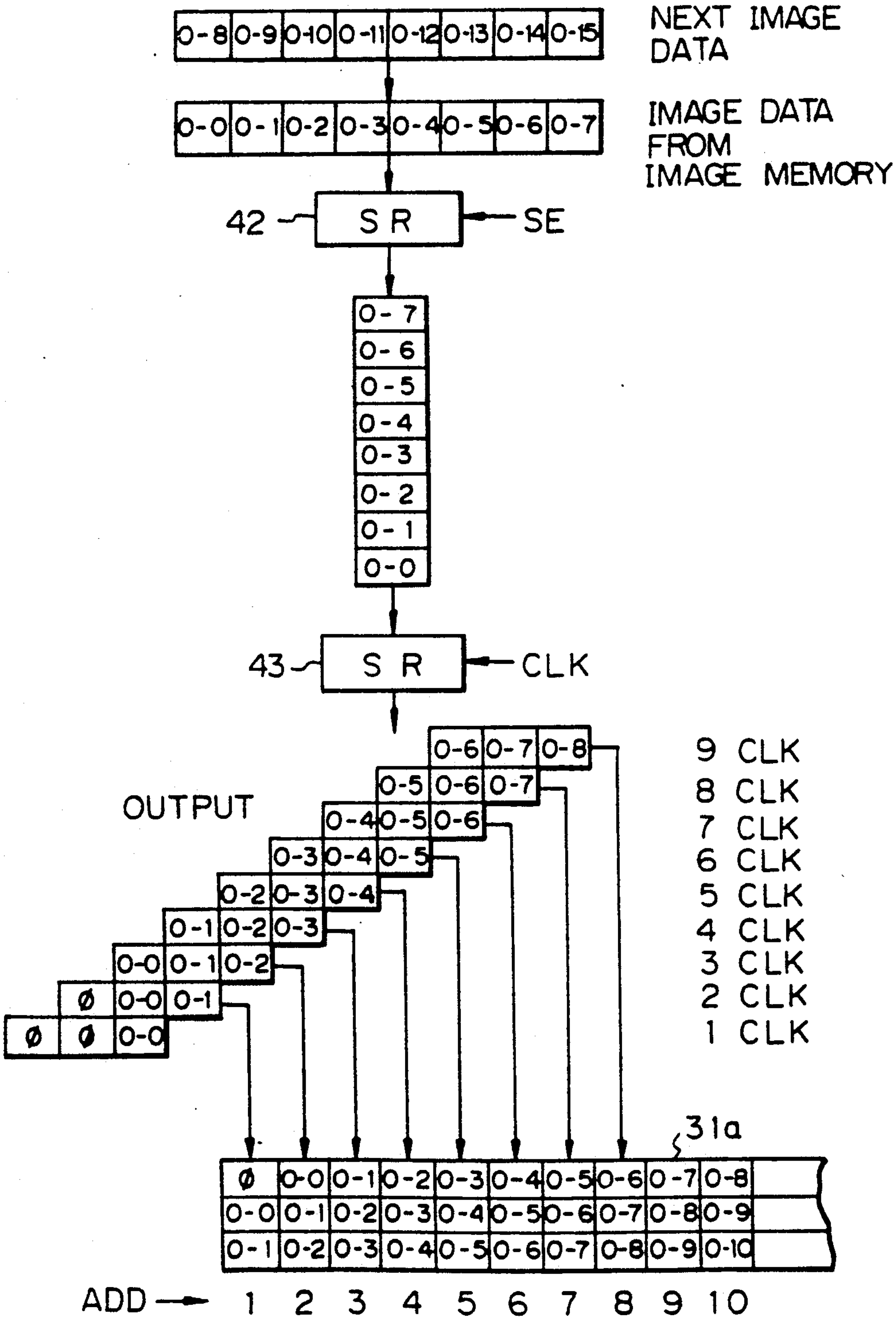
FIG. 9 is a view for explaining a write operation to the basic line memory.

FIG. 9 is a view for explaining a write operation to the basic line memory. This drawing is provided for explaining the write operation of the image data into the basic line memories 31*a* to 31*c* and corresponds to FIGS. 4A, 4B, and 5. The serial data from the shift register 42 is input to the shift register 43. The shift register 43 outputs the packed image data in response to the clock signal CLK from the image bus control circuit 41. The output by the first clock (1 CLK) is not written into the basic line memory and is used as dummy bits for forming the window in the first address ADD 1. The shift register 43 outputs the packed data "0-0, 0-1, 0-2" in response to the second clock (2 CLK) and stores it in the address ADD 1 in the basic line memory 31*a*. The shift register 43 repeats the above operation in response to the clock signal CLK.

Figure 10:
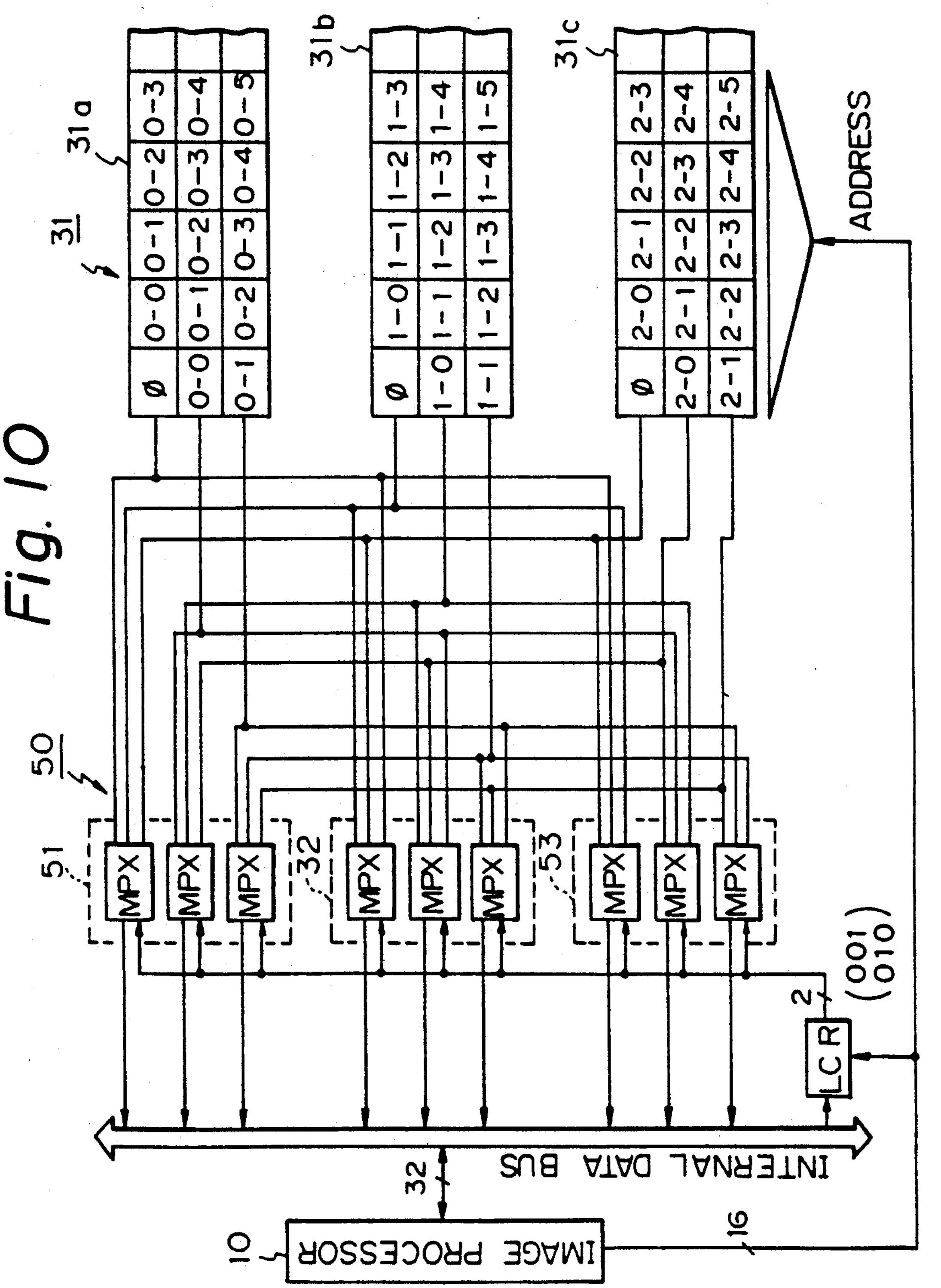
FIG. 10 is a detailed block diagram of an order conversion circuit shown in FIG. 7.

FIG. 10 is a detailed block diagram of the order conversion circuit shown in FIG. 7. Each of the multiplexers 51 to 53 is formed by three multiplexers and is connected to the basic line memories 31*a* to 31*c* as shown in the drawing. The image processor 10 sends the command to the line control register LCR so as to select the multiplexer. The line control register LCR generates a two bit selection signal to each multiplexer. For example, the bits "0, 0" select the multiplexer 51, the bits "0, 1" select the multiplexer 52 and the bits "1, 0" select the multiplexer 53.

Figure 11:
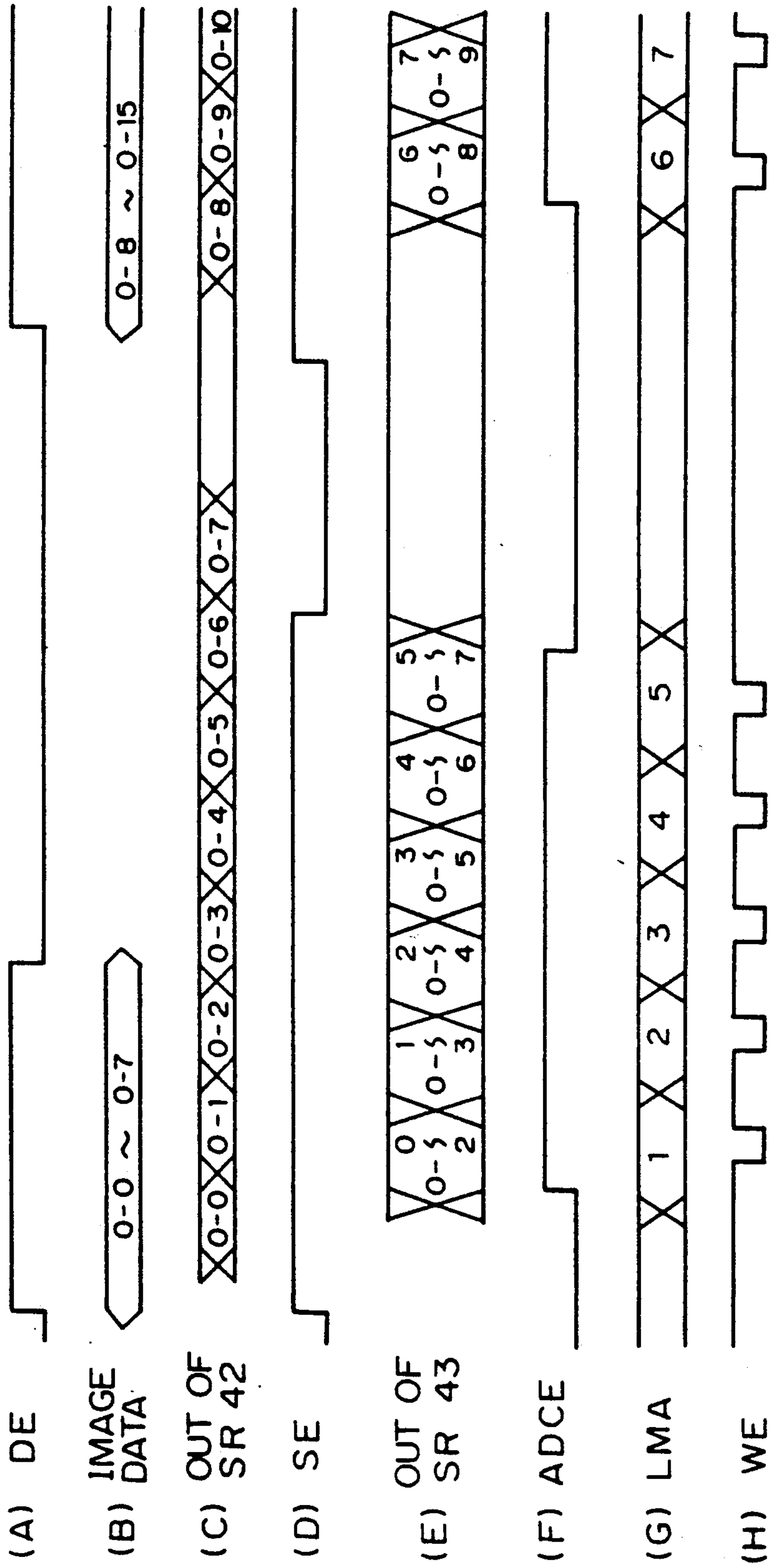
FIG. 11 is a signal timing chart of a write operation to the basic line memory.

FIG. 11 is a signal timing chart for explaining a write operation to the basic line memory. In FIG. 11, (A) to (H) corresponds to the same characters in FIG. 7. The data enable signal DE is transferred between the image buffer memory 20 and the image bus IB. The image data on the image bus IB is shown by 8 bits and is synchronized with a data enable signal DE. The shift register 42 outputs a serial data converted from the parallel data. The image bus control circuit 41 outputs a shift enable signal SE to the shift register 42. The shift register 43 outputs the packed data having 3 bits in response to the clock signal CLK from the image bus control circuit 41. The image bus control circuit 41 outputs an address counter enable signal ADCE to the address counter ADC and the length counter LEC. The address counter ADC outputs a line memory address LMA to the basic line memories 31*a* to 31*c*. The image bus control circuit 41 outputs a write enable signal WE to the basic line memories 31*a* to 31*c*.

Figure 12:
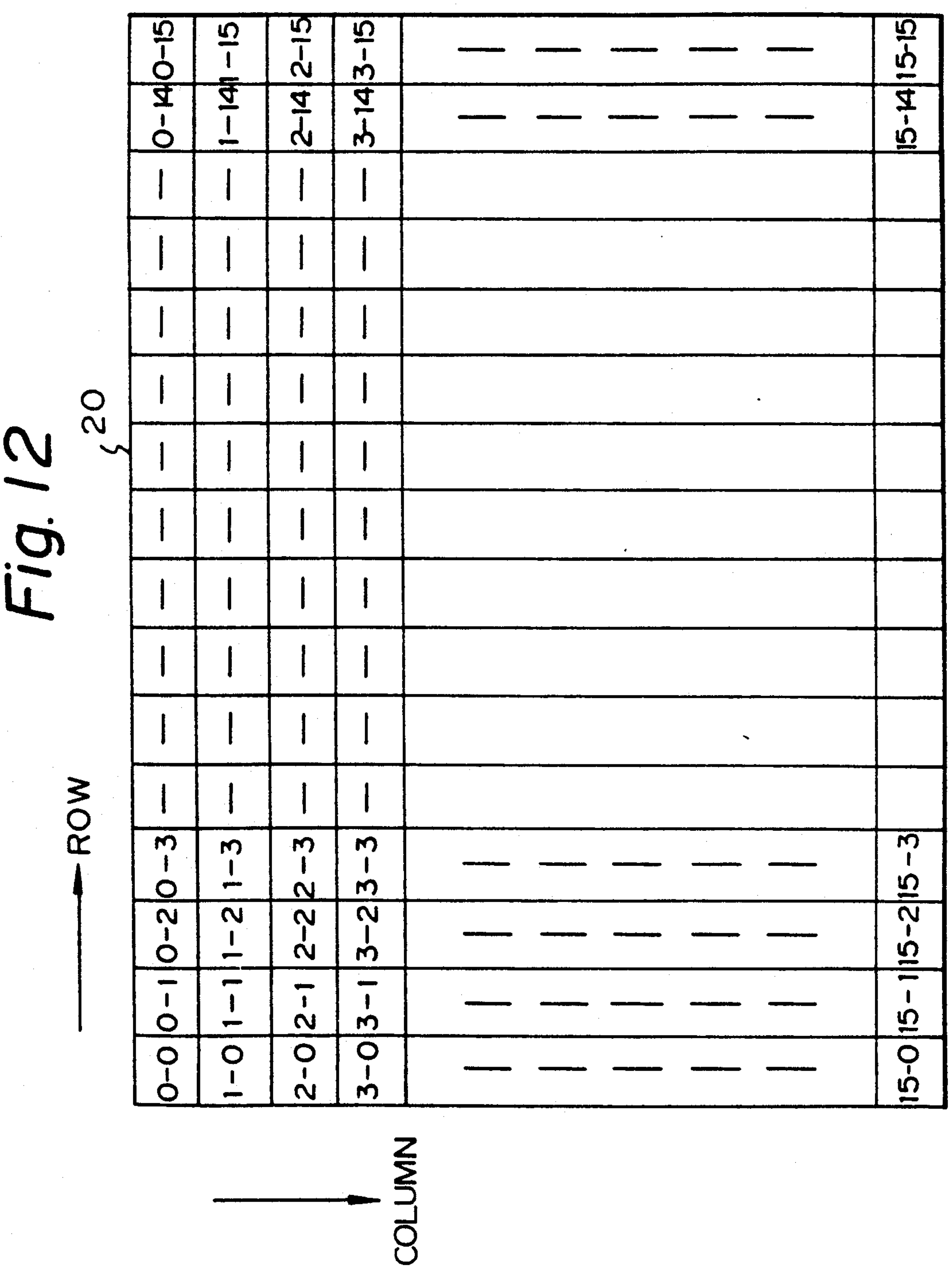
FIG. 12 is one example of data stored in the image buffer memory.

FIG. 12 is one example of stored data in the image buffer memory. This drawing corresponds to FIG. 3. In this case, one column comprises 16 bits (0-0, 0-1, . . . , 0-15). Accordingly, the first 8 bits (0-0, 0-1, . . . , 0-7) are input to the shift register 42, and the next 8 bits (0-8, 0-9, . . . , 0-15) are input to the shift register 42 in the next step as shown in FIG. 9.

I claim:

1. An image data read out system in a digital image processing system, comprising:

an image buffer memory for storing image data, a predetermined area of said image buffer memory being defined as a window having a size of n (columns)×m (rows);

an image data processing circuit, operatively connected to said image buffer memory, for sequentially reading out said image data from one of said columns in said image buffer memory, converting a bit structure of said image data from parallel data to serial data, packing said serial data into packed data in predetermined groups of bits, and transferring said packed data to a next stage;

a basic line memory group, operatively connected to said image data processing unit, having n basic line memories, where n corresponds to the number of columns, each of said basic line memories having m line memories, where m corresponds to the number of rows, said image data of one column being stored in one of said basic line memories such that each bit of said image data is shifted one by one at every one of said line memories;

an order conversion circuit, operatively connected to said basic line memory group, for arranging said image data simultaneously read out from each of said basic line memories in accordance with the arrangement of the columns in the image buffer memory; and a microprocessor, operatively connected to said order conversion circuit and said basic line memory group, for accessing the same address in each of said basic line memories, simultaneously reading out accessed image data from each of said basic line memories, and calculating said accessed image data after arranging said accessed image data in said order conversion circuit.

2. An image data read out system as claimed in claim 1, wherein said image data processing circuit comprises:

an image bus control circuit, operatively connected to said image buffer memory, for outputting a shift enable signal, a clock signal, a write enable signal and a counter enable signal;

first and second shift registers, operatively connected to said image bus control circuit, said first shift register receiving said shift enable signal and converting parallel data to serial data in response to said shift enable signal and said second shift register receiving said clock signal and converting serial data into m bits of packed data, m corresponding to a number of rows;

a plurality of drivers, operatively connected between said second shift register and said basic line memories, each of said plurality of drivers cyclically selecting one of said basic line memories; and an address counter and a length counter, coupled together and operatively connected to said image bus control circuit and said microprocessor, for receiving said counter enable signal.

3. An image data read out system as claimed in claim 1, further comprising a line control register, operatively connected to said microprocessor and said plurality of drivers, for outputting bits, wherein said order conversion circuit comprises a plurality of multiplexers corresponding to the number of said basic line memories, each of said multiplexers operatively connected to a corresponding one of said basic line memories and said line control register, and selected by two bits from said line control register.

4. An image data read out system as claimed in claim 1, further comprising:

an address counter operatively connected to said microprocessor; and a length counter operatively connected to said microprocessor, wherein an address and bit length of said basic line memories is determined by said address counter and said length counter.

5. An image data read out system as claimed in claim 1, further comprising:

a central processing unit;

an address counter operatively connected to said central processing unit and said image buffer memory; and a length counter operatively connected to said central processing unit and said image buffer memory, wherein an address and bit length of said image memory is determined by said address counter and said length counter.

6. An image data read out system as claimed in claim 2, wherein an address and bit length of said basic line memory is determined by said address counter and said length counter.

7. An image data read-out system comprising:

an image buffer memory for storing image data, a predetermined area of said image buffer memory being defined as a window having an area of n columns × m rows;

an image data processing circuit operatively connected to said image buffer memory, comprising:

an input circuit operatively connected to said image data processing circuit;

a bit conversion circuit operatively connected to said input circuit for converting parallel data into serial data;

a packing circuit, operatively connected to said bit conversion circuit, for packing one bit of serial data into m bits of packed data; and driver means, operatively connected to said packing circuit;

basic line memory means including a plurality of basic line memories, respectively, operatively connected to said driver means, said basic line memories being cyclically selected by said driver means;

an order conversion means, operatively connected to said driver means and said basic line memories, for aligning the bit order of said image data in said window of said image buffer means; and image processing means, operatively connected to said order conversion means, for simultaneously reading out all of said aligned image data.

8. A method for reading out image data in a digital image processing system, said method comprising the steps of:

(a) loading a microprogram into a memory;

(b) setting an initial value of address and length information by an address register and a length register in an image memory;

(c) outputting the image data to an image bus;

(d) converting parallel image data to serial image data;

(e) packing serial data to obtain packed data;

(f) writing the packed data to a basic line memory;

(g) repeating said steps (c) through (f) until the value of the length information is zero;

(h) reading image data from the basic line memory to an image processor; and (i) calculating image data in the image processor and writing the calculated image data into the memory.

* * * * *